United States Patent
Amaya et al.

(10) Patent No.: US 11,390,021 B2
(45) Date of Patent: Jul. 19, 2022

(54) METHOD FOR PRODUCING THREE-DIMENSIONAL SHAPED PRODUCT, AND THREE-DIMENSIONAL SHAPED PRODUCT OBTAINED BY THE METHOD

(71) Applicant: Matsuura Machinery Corporation, Fukui (JP)

(72) Inventors: Koichi Amaya, Fukui (JP); Midorikawa Tetsushi, Fukui (JP); Seiichi Tomita, Fukui (JP); Ryuzo Tanaka, Fukui (JP)

(73) Assignee: Matsuura Machinery Corp., Fukui (JP)

( * ) Notice: Subject to any disclaimer, the term of this patent is extended or adjusted under 35 U.S.C. 154(b) by 0 days.

(21) Appl. No.: 17/601,622

(22) PCT Filed: Apr. 30, 2021

(86) PCT No.: PCT/JP2021/017264
§ 371 (c)(1),
(2) Date: Oct. 5, 2021

(87) PCT Pub. No.: WO2021/246098
PCT Pub. Date: Dec. 9, 2021

(65) Prior Publication Data
US 2022/0097297 A1    Mar. 31, 2022

(30) Foreign Application Priority Data

Jun. 1, 2020   (JP) .................................. 2020-095202

(51) Int. Cl.
*B29C 64/153*   (2017.01)
*B29C 64/268*   (2017.01)
(Continued)

(52) U.S. Cl.
CPC .......... *B29C 64/153* (2017.08); *B29C 64/205* (2017.08); *B29C 64/268* (2017.08); *B33Y 10/00* (2014.12); *B33Y 30/00* (2014.12)

(58) Field of Classification Search
None
See application file for complete search history.

(56) References Cited

U.S. PATENT DOCUMENTS

2015/0273728 A1* 10/2015 Okamoto .............. B29C 64/165
                                                           425/150
2019/0299290 A1* 10/2019 Kuhns ..................... B22F 7/002
2020/0269345 A1*  8/2020 Yamada ................. B33Y 50/00

FOREIGN PATENT DOCUMENTS

JP       6776004 B2     9/2015
JP       6532180 B1     6/2019
WO    2017/154148 A1    9/2017

* cited by examiner

Primary Examiner — Matthew J Daniels
Assistant Examiner — Paul Spiel
(74) Attorney, Agent, or Firm — Richard M. Goldberg

(57) ABSTRACT

A method for producing a three-dimensional shaped product based on repetition of a step of molding of a powder layer 3 and sintering with a laser beam or an electron beam, wherein in a lattice region 1, a sintered layer 41 is molded by scanning the beam having a predetermined spot diameter several times in one side direction at a predetermined interval, after which a sintered layer 42 is again molded by the same scanning in the other side direction which crosses the one side direction, and in an outer frame region 2, a continuous sintered layer 43 is molded by scanning the beam having the predetermined spot diameter over the entire lattice region 1 that is surrounded by an inner line and an outer line, and is also achieved by a three-dimensional shaped product obtained by the method.

44 Claims, 12 Drawing Sheets

(51) Int. Cl.
*B33Y 10/00* (2015.01)
*B29C 64/205* (2017.01)
*B33Y 30/00* (2015.01)

METHOD FOR PRODUCING THREE-DIMENSIONAL SHAPED PRODUCT, AND THREE-DIMENSIONAL SHAPED PRODUCT OBTAINED BY THE METHOD

TECHNICAL FIELD

The present invention relates to a method for producing a three-dimensional shaped product, targeting a surrounding outer frame and a lattice structure on an inner side after having established layering based on sequential repetition of a step of molding a powder layer by dispersion of powder while sliding a squeegee and sintering the powder layer using a laser beam or an electron beam, as well as to a three-dimensional shaped product obtained by the method.

BACKGROUND OF THE INVENTION

Methods for producing three-dimensional shaped products are known wherein layering is established based on sequential repetition of a step of molding a powder layer by dispersion of powder while sliding a squeegee and sintering the powder layer using a laser beam or an electron beam.

For many three-dimensional shaped products formed by such methods for producing the three-dimensional shaped products, the interior of the shaped product must often have gas permeability, i.e. a degassing structure, such as in the case of cavity-type die products or filter products, to allow production of lightweight three-dimensional shaped products with low density.

As one three-dimensional shaped product production method that requires the gas permeability, Patent Document 1, for example, describes creating gas channels by way of a vesicular structure, in other words, a porous structure, but strength of the resulting shaped product is low, because the gas channels composed of the porous structure are formed by lowering the density of a solidified material, and the channels through which gas circulates are undefined and non-linear, therefore making it impossible to avoid the disadvantage of a low gas flow rate.

On the other hand, in Patent Document 2, a method for producing a lattice region is provided wherein, after scanning a specific metal powder layer with a laser beam having a predetermined spot diameter in lines several times at predetermined intervals (:sintering with a first raster configuration), an adjacent metal powder layer on the upper side is sintered with the same laser beam in the direction perpendicular to the direction of the lines (:sintering with second raster configuration), repeating layering of each metal powder and scanning by the laser beam in perpendicular directions described above (see Claim 3 and FIG. 4).

Specifically, according to the invention of Patent Document 2, sintering along the horizontal direction (:X-direction) and vertical direction (:Y-direction) in which open pores in the lattice region are formed is carried out alternately every two layers.

Referring to FIG. 2 of Patent Document 2, and as shown in FIG. 10(a), either the vertical or the horizontal direction in which the laser beam scans matches a sliding direction of the squeegee, such matching is established based on common technical knowledge for efficient use of space for production of the three-dimensional shaped product.

However, even though the squeegee slides with a predetermined pressing force to flatten the surface of the metal powder layer, when the squeegee slides over a line-shaped sintered layer by scanning of the laser beam in the direction that is perpendicular to the sliding direction among the vertical and the horizontal directions during an early stage of molding the powder layer while sliding, presence of thickness of a pressed metal powder layer between a site over the line-shaped sintered layer and a site where another metal powder layer is further superimposed on the metal powder layer sandwiched between the regions, necessarily creates a difference in degree of compression undergone by the pressing force of a tip on a squeegee sliding direction side, even if width of the squeegee in the sliding direction is larger than a width of the sintered layer.

When the laser beam has been scanned in the direction perpendicular to the line-shaped sintering after sliding of the squeegee, the aforementioned difference unavoidably results in molding of an uneven sintered layer with fine irregularities in a transverse direction, as shown in FIG. 10(b) (note that the irregular form is exaggerated in FIG. 10(b) for emphasis).

Further, with alternate sintering every two layers as according to the invention of Patent Document 2, bonding only takes place along a two-dimensional surface where the horizontal direction (:x direction) and the vertical direction (:y direction) are in contact in the transverse direction, the bonding via a three-dimensional cube shaped by the horizontal direction (:x direction) and the vertical direction (:y direction) at identical heights is non-uniform, and a strength of the lattice region is by no means sufficient.

Moreover, in the invention of Patent Document 2 where an outer frame region is shown in the drawing, no explanation is given regarding a relationship between sintering in the lattice region and sintering in the outer frame region.

PRIOR ART DOCUMENTS

Patent Documents

Patent Document 1: Japanese Patented Official Gazette No. 5776004
Patent Document 2: Japanese Patented Official Gazette No. 6532180

SUMMARY OF INVENTION

Technical Problem

It is an object of the present invention to provide a method for producing a three-dimensional shaped product targeting a lattice region with a uniform shape and firm bonding, and an outer frame region disposed on the outer sides of the region, as well as a structure of a three-dimensional shaped product structure obtained by the method.

Solution to Problem

In order to achieve the object stated above, the basic construction of the present invention is as follows:

(1) A method for producing a three-dimensional shaped product comprising the steps of:
  establishing layering based on sequential repetition of steps of molding a powder layer by:
    dispersion of powder,
    sliding a squeegee over the dispersed powder and sintering the powder layer using a laser beam or an electron beam,
  targeting the sintering for each powder layer to an outer frame region which is connected to a gas-permeable lattice region and which is outside of the gas-permeable lattice region and is disposed around the entire periphery of the gas-permeable lattice region, and molding, for each of the powder layers targeted for the lattice region, a sintered layer along one side direction by parallel scanning of the laser beam or the electron beam having a predetermined spot diameter several times in the one side direction at a predetermined interval with mutually facing outer frame regions bonded, thereafter molding a sintered layer in the other side direction again by parallel scanning of the laser beam or the electron beam having the predetermined spot diameter several times at the predetermined interval with mutually facing outer frame regions bonded, in the other side direction that crosses with the one side direction within each of the same powder layers, such that:

the sintered layer along the one side direction and the sintered layer along the other side direction are crossing, and the sintered layer along the one side and the sintered layer along the other side are is bonded in a superimposed state in a crossed region and in a range with identical height, whereas carrying out sintering on only one side or only on the another side in a non-crossed region, molding, while in the outer frame regions, a continuous sintered layer by scanning the laser beam or the electron beam having the predetermined spot diameter over the entire periphery that is surrounded by an inner line and an outer line;

(2) The method for producing a three-dimensional shaped product according to (1) above, wherein for the shape of the outer frame region, the inner line and the outer line have an identical center location positioned in relation to a symmetry of a regular polygonal shape or a curved shape in a mutually similar relationship;

(3) The method for producing a three-dimensional shaped product according to (1) above, further comprising the steps of:

separating the outer frame regions by a predetermined width and which are divided by parallel lines selected in specific directions, and scanning the laser beam or the electron beam in a the direction perpendicular to the parallel direction in an early stage, a later stage, or an intermediate stage of molding for the sintered layers in the lattice region.

Advantageous Effects of Invention

In the three-dimensional shaped product according to the basic construction (1), the basic construction (2) and the basic construction (3), even if either the one side direction or the other side direction in which the laser beam or the electron beam (hereunder referred to as "beam") is scanned is perpendicular to a sliding direction of the squeegee, since the squeegee slides over a line-shaped sintered layer molded in a direction crossing that direction, if a beam scanning direction and the sliding direction of the squeegee are perpendicular as in the invention of Patent Document 2, then it is possible to avoid molding for the sintered layer with fine irregularities in a transverse direction due to uneven pressing force by sliding of the squeegee as shown in FIG. 10(b), which is caused by differences in thickness of the metal powder layer.

Further, in the case of the basic construction (1), for each powder layer, the bonding is three-dimensional in a range with identical height where a line-shaped sintered layer formed by scanning of the beam in one side direction and a line-shaped sintered layer formed by scanning of the beam on the other side are formed by the same powder layer, so that the sintered layer along the one side direction and the sintered layer along the other side direction are crossing, the sintered layer along the one side and the sintered layer along the other side is bonded in the superimposed state in the crossed region and the sintering is carried out on only one side or only on the other side in the non-crossed region, with three-dimensional cuboid bonding which is clearly stronger than bonding along two-dimensional sides that are in mutual contact in the transverse direction as according to the invention of Patent Document 2, thus allowing the lattice region to be ensured by firm bonding.

In the basic construction (1), sintering in the lattice region and sintering in the outer frame region can be sequentially carried out efficiently for each powder layer.

DESCRIPTION OF THE PREFERRED EMBODIMENTS

When using a die that is a three-dimensional shaped product with an outer frame and an inner lattice structure obtained by the basic constructions (1), (2) and (3), powder used is usually metal powder.

However, when the three-dimensional shaped product is a product other than the die such as a filter, the powder does not necessarily need to be the metal powder, and plastic powder, etc. are also typically used, and such a state is identical in the case of the three-dimensional shaped product has a low density.

Figure 1A:
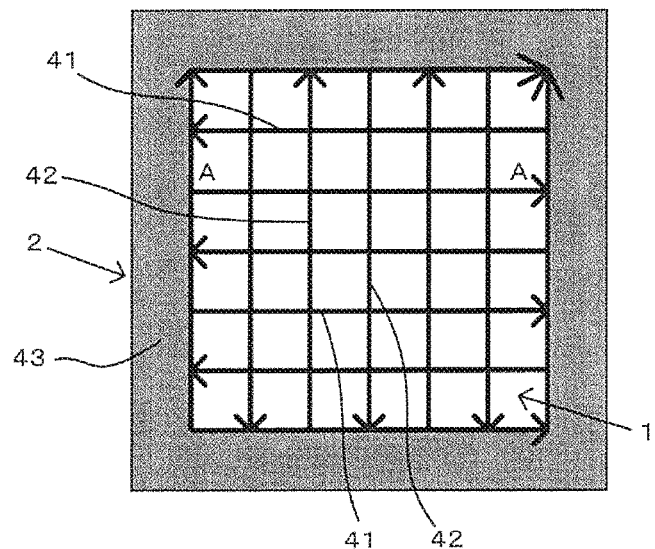
FIG. 1 shows a method for producing the basic construction (1) in which a shape of sintered layers by scanning a beam along one side direction and the other side direction is straight linear, where (a) is a plan view of an embodiment in which both directions are perpendicular, (b) is a plan view of an embodiment in which both directions are mutually diagonal, and (c) is a cross-sectional view of sequentially molding from a first layer to a second layer, in a beam scanning direction that connects A-A in (a) and (b).
Figure 2A:
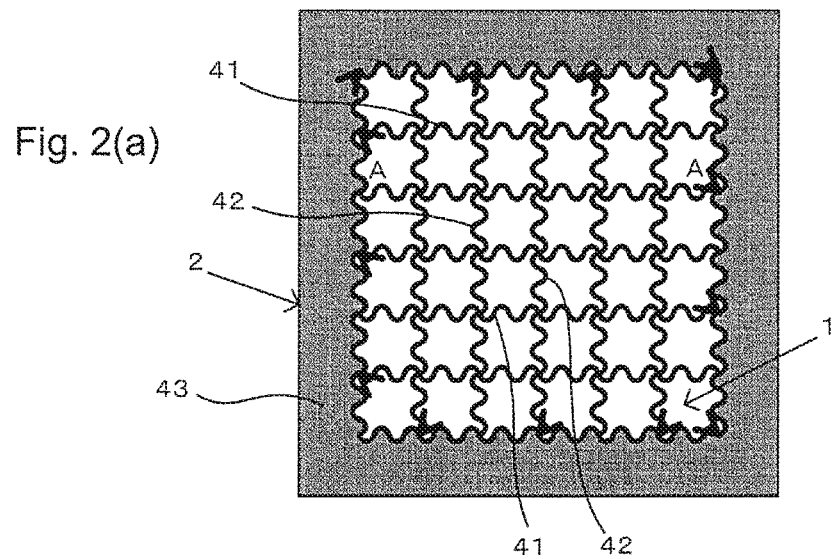
FIG. 2 shows a method for producing the basic construction (1) in which the shape of the sintered layers by scanning the beam along one side direction and the other side direction is wavy, where (a) is a plan view of an embodiment in which both directions of a wavy form with a regular varying curve are perpendicular, (b) is a plan view of an embodiment in which both directions of the wavy form with a regular varying segment are mutually diagonal, and (c) is a cross-sectional view of sequentially molding from the first layer to the second layer, in the beam scanning direction that connects A-A in (a) and (b).

Upon appropriate selection of such a material, the basic construction (1), as shown in FIGS. 1(a), (b) and (c) and FIGS. 2(a), (b) and (c), is a method for producing the three-dimensional shaped product in which layering is established based on sequential repetition of steps of molding a powder layer 3 by dispersion of powder while sliding a squeegee 6 and sintering the powder layer 3 using a laser beam or an electron beam, wherein the sintering for each powder layer 3 is targeted to an outer frame region 2 which is connected to a gas-permeable lattice region 1 and to the outsides of the region 1 and is disposed around the entire periphery of the region 1, and for each of the powder layers 3 targeted for the lattice region 1, a sintered layer 41 is molded along one side direction by parallel scanning of the laser beam or the electron beam having a predetermined spot diameter several times in one side direction at a predetermined interval with the mutually facing outer frame regions 2 bonded, after which a sintered layer 42 is molded in the other side direction again by parallel scanning of the laser beam or the electron beam having the predetermined spot diameter several times at the predetermined interval with the mutually facing outer frame regions 2 bonded, in the other side direction that crosses with the one side direction within each of the same powder layers 3, the sintered layer 41 along the one side direction and the sintered layer 42 along the other side direction are crossing, and the sintered layer 41 along the one side and the sintered layer 42 along the other side is bonded in a superimposed state in a crossed region, whereas sintering is carried out on only one side or only on the other side in a non-crossed region, while in the outer frame regions 2, a continuous sintered layer 43 is molded by scanning the laser beam or the electron beam having the predetermined spot diameter over the entire periphery that is surrounded by an inner line and an outer line.

For the basic construction (1), the layering and the sintering are carried out in the lattice region 1 and the outer frame region 2 in each layer, and the outer frame region 2 is surrounded by the inner line and the outer line, and has the width formed by both lines.

Figure 3A:
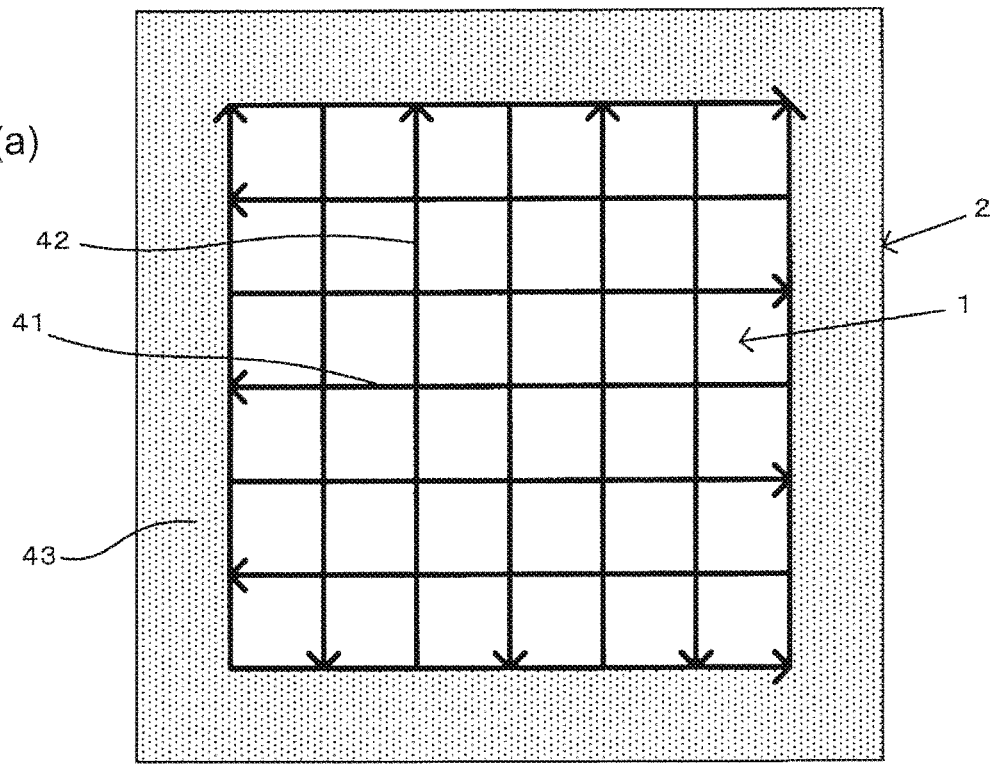
FIG. 3 shows an embodiment of the basic construction (2), where (a) is a plan view of a square as a typical example of a regular polygonal shape, and (b) is a plan view of a circle as a typical example of a curved shape.
Figure 3B:
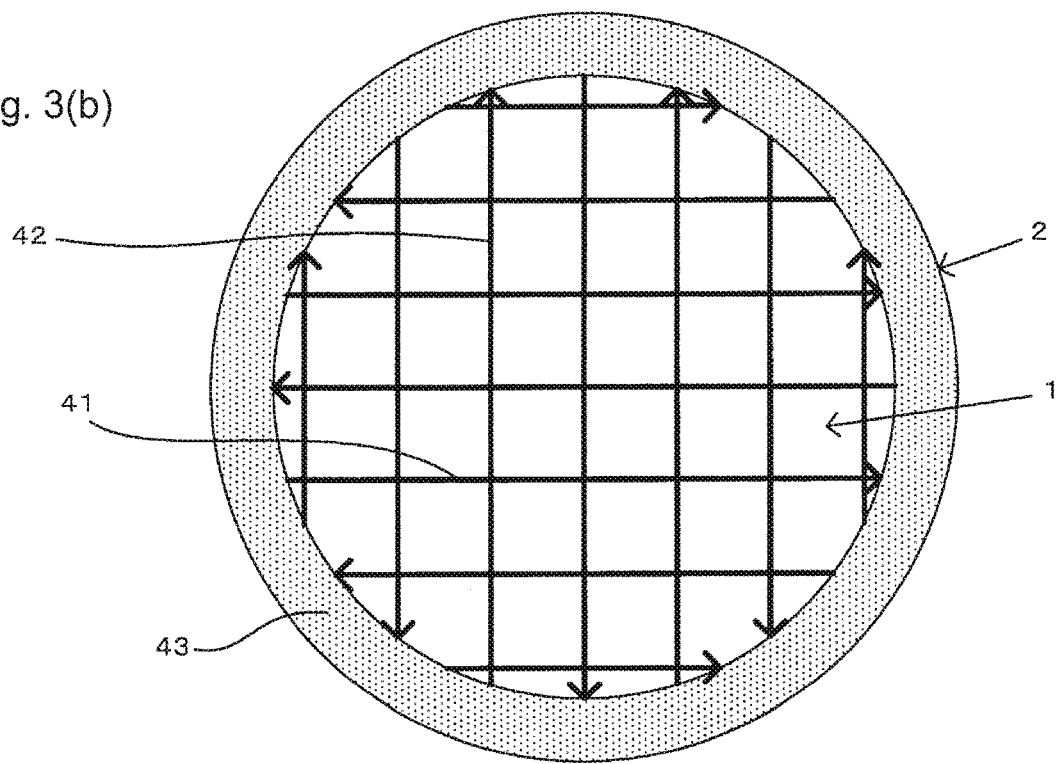

Various embodiments may be employed for the shape of the outer frame region 2 formed by the inner line and the outer line, a typical example of the basic construction (2) is composed in that the inner line and the outer line have identical center locations, and either a regular polygonal shape or curved shape in a mutually similar relationship is employed, and the square shown in FIG. 3(a) and the circular shape shown in FIG. 3(b) are embodiments of the simplest shapes.

Polygonal shapes may be hexagonal, rectangular or square shapes while curved shapes may be ellipsoid or circular shapes.

For the basic construction (2), the outer frame region 2 can be formed with a uniform structure by the inner line and the outer line having similar shapes.

For sintering of the outer frame region 2, it is sufficient to form the continuous sintered layer 43 in the region surrounded by the inner line and the outer line as in the basic construction (1), the continuous sintered layer 43 is generally created in a manner unrelated to formation of the sintered layers 41, 42 in the lattice region 1.

In most cases, however, the basic construction (3) will be employed in which the outer frame regions 2 are separated by a predetermined width and divided by parallel lines selected in specific directions, and the laser beam or the electron beam is scanned in the direction perpendicular to the parallel direction in an early stage, a later stage, or an intermediate stage of molding for the sintered layers 41, 42 in the lattice region 1.

In the case of the basic construction (3), computer processing is facilitated wherein division is performed along the parallel lines separated by the predetermined width, and more simple control can be maintained by specifying a beam scanning direction.

In the basic construction (3), sintering of the outer frame regions 2 is usually selected to be in the early stage or the later stage of the sintering of the lattice region 1, although the intermediate stage may also be selected.

In almost all cases, the intermediate stage is selected to be the early stage of carrying out the sintering in the other side direction after completion of the sintering in the one side direction.

This is because shaping of the sintered layer 41 in the one side direction and the sintered layer 42 in the other side direction must be carried out continuously.

Figure 4A:
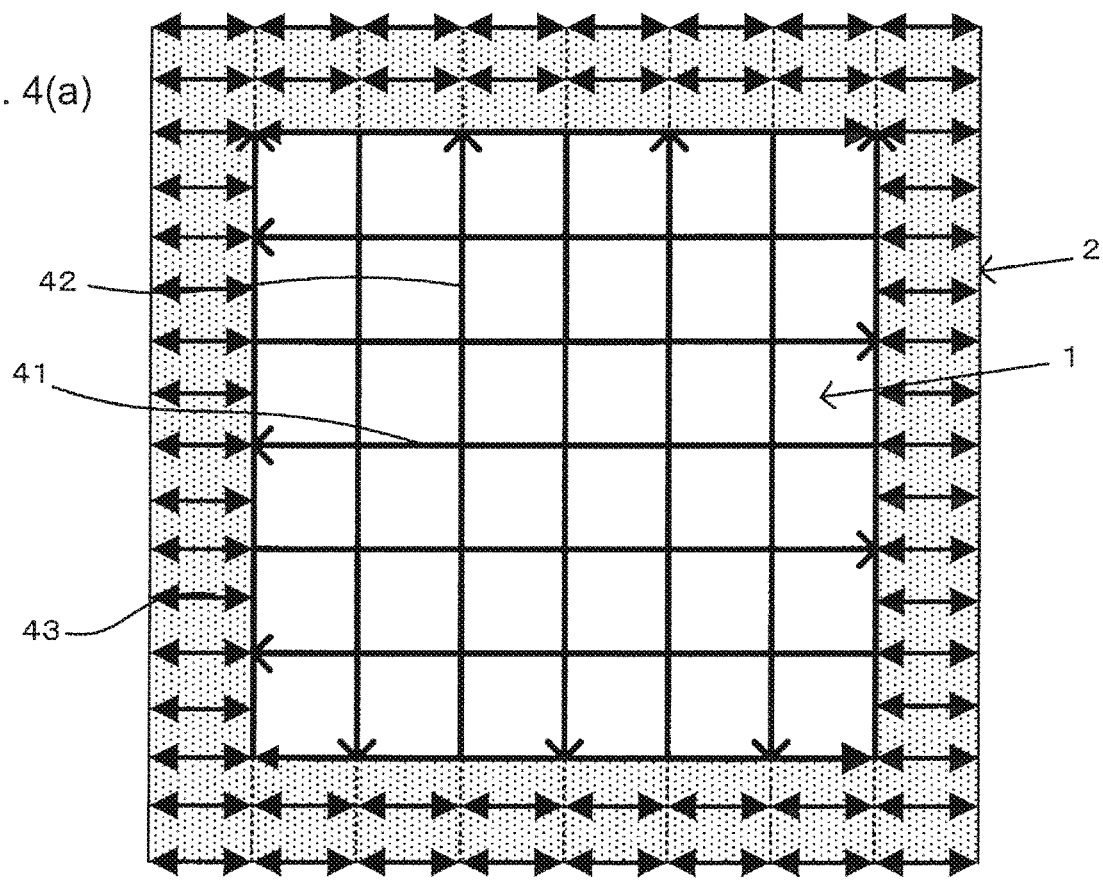
FIG. 4(a) shows an embodiment of the basic construction (3), as a plan view showing a case where the parallel lines are the directions of specific sides of the square, when the square shape of FIG. 3(a) is employed (the double arrows indicate the directions perpendicular to the parallel directions).

For the basic construction (3), when the regular polygonal shape is selected as the basic construction (2) and the direction of a specific side of the regular polygonal shape is selected for the parallel line direction, it is possible to carry out simple scanning in which the specific side is completely sintered by scanning of the beam in the direction perpendicular to the parallel direction, while the other sides are completely sintered by scanning of the beam within a divided region, as shown in FIG. 4(a).

Figure 4B:
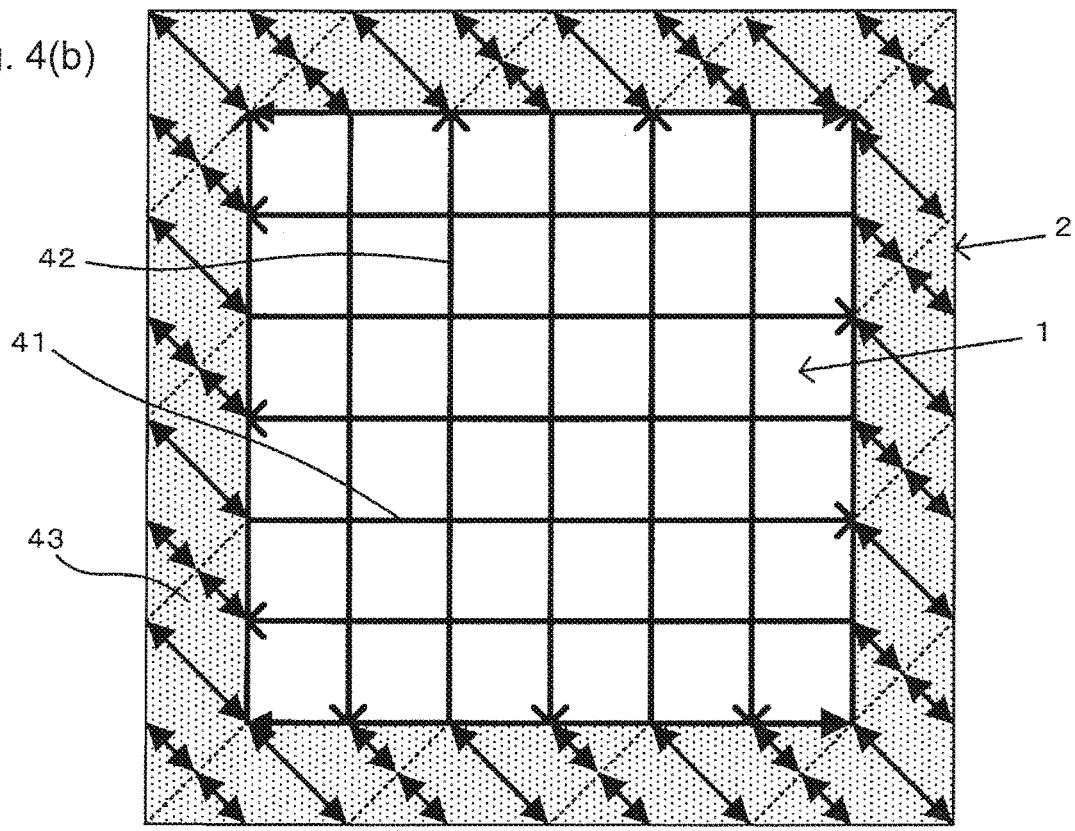
FIG. 4(b) shows an embodiment of the basic construction (3), as a plan view showing a case where the parallel lines are in directions that form a maximum distance in the regions surrounded by the inner line and outer line forming regular polygonal shapes or curved shapes, given a predetermined width, when the square shape of FIG. 3(a) is employed (the double arrows indicate the directions perpendicular to the parallel directions).

In the basic construction (3), after selecting the regular polygonal shape or the curved shape for the basic construction (2), when a direction has been selected for parallel lines as the direction that forms a maximum distance in the region surrounded by the inner line and the outer line forming the regular polygonal shape or the curved shape of the basic construction (2), for the predetermined width, as shown in FIG. 4(b), and scanning location has been slid sequentially from the end of one of the parallel lines reaching to the end of another parallel line, the scanning width is sequentially increased in stages from the initial to reach a maximum at the intermediate stage and thereafter sequentially decreases to 0, thus allowing relatively simple control of a beam scanning width.

When the regular polygonal shape is square, the direction of the parallel lines that exhibits the maximum width is necessarily a direction of 45° with respect to the parallel sides, so long as it is formed at an apex where the inner line and the outer line are adjacent.

Figure 4C:
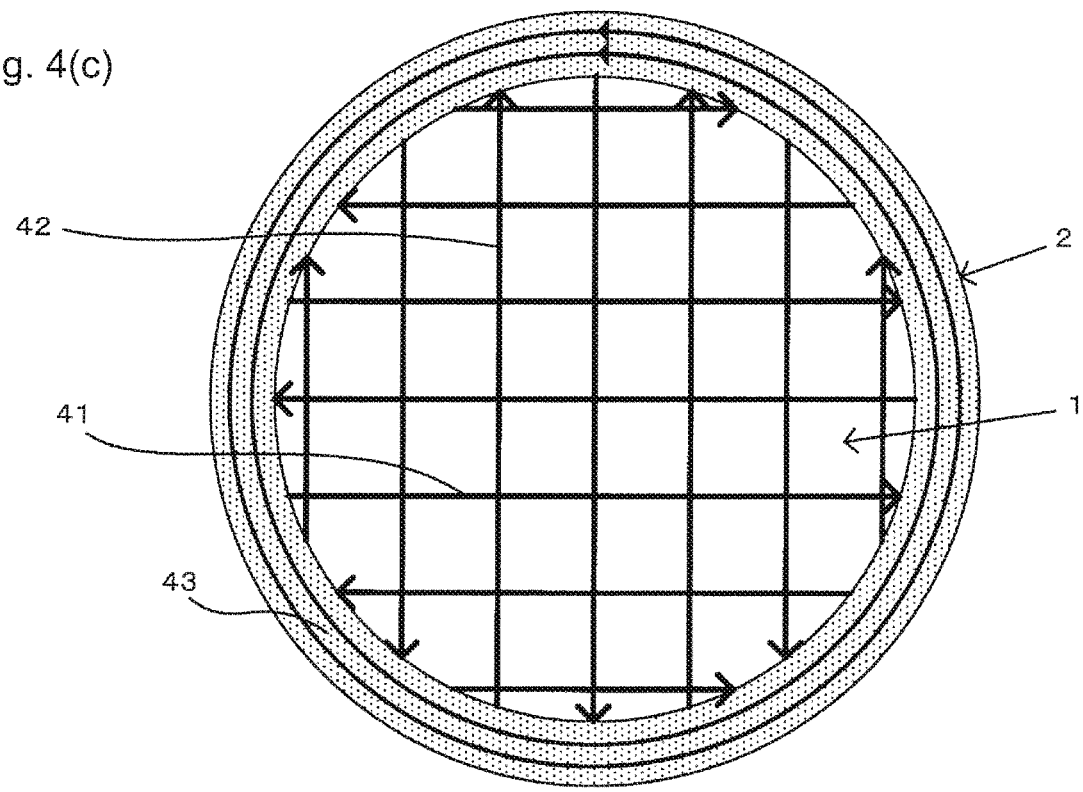
FIG. 4(c) shows an embodiment different from the basic construction (3) for sintering in the outer frame region, as a plan view showing scanning of the beam along a trajectory where the inner line and the outer line are in a similar relationship, when the circle of FIG. 3(b) is employed (the curved single direction arrows indicate the beam scanning direction).

Separately from sintering by the basic construction (3), it is possible to employ a sintering method by scanning of the beam along a trajectory such that the inner line and the outer line forming the regular polygonal shape or the curved shape of the basic construction (2) are in a similar relationship at the early stage, the later stage or the intermediate stage of molding for the sintered layers 41, 42 in the lattice region 1, as shown in FIG. 4(c).

With a sintering method in which movement is along trajectory lines in this similar relationship, a trajectory pattern is set in advance along the similar shape and the size of the pattern is sequentially varied as it recedes from the center location, which allows simple control to be effected.

In a sintering method with this trajectory as well, it is most common to select the early stage or the later stage of sintering of the lattice region 1, but even if the intermediate stage is selected, the early stage in which sintering is complete in the one side direction and sintering is begun in the other side direction is selected in almost all cases, as for the basic construction (3).

Although it is possible to select a method in which a spot diameter larger than the spot diameter for the lattice region 1 is used for sintering with the beam in the outer frame region 2, and a greater number of scans is also set, a large beam diameter is more efficiently suitable for sintering.

For the laser beam or the electron beam that scans the outer frame region 2, in particular, if an embodiment is employed in which a spot diameter is selected that is larger than the spot diameter in the lattice region 1, and power density is set so that the power of the beam per unit area for the spot diameter is the same as the power of the beam in the lattice region 1, then it will be possible to obtain a sintered state with firm bonding the same as the lattice region 1 in the outer frame region 2 as well.

The spot diameter of the beam in the basic construction (1) is usually selected within a range of 0.05 mmcp to 0.6 mmcp, while in most cases the predetermined interval is selected to be 0.06 mm to 1.0 mm and the width of an open pore 11 is set to be in the range of 0.01 mm to 0.4 mm.

In the case of the basic construction (1), the shapes of the lines formed by parallel scanning in the lattice region 1 along the one side direction or the other side direction for each of the same powder layers 3 may be selected from among various shapes. FIGS. 1(a) and (b) show rectilinear forms, FIG. 2(a) shows an embodiment with a continuous wavy form with a regularly varying curve (FIG. 2(a) is a case of a continuous circular arc shape with a sequentially and alternately varying curved direction), and FIG. 2(b) shows an embodiment with a continuous wavy form with a regularly varying segment (FIG. 2(b) is a case of a continuous form with the segment direction sequentially and alternately regularly varying by approximately 45°), and naturally the shapes formed by bonding of the wavy and rectilinear forms may also be employed.

Simple scanning is possible with the rectilinear form, while sintered density per unit area of a plane can be increased in the beam scanning direction with the wavy form, compared to the rectilinear form.

Figure 1B:
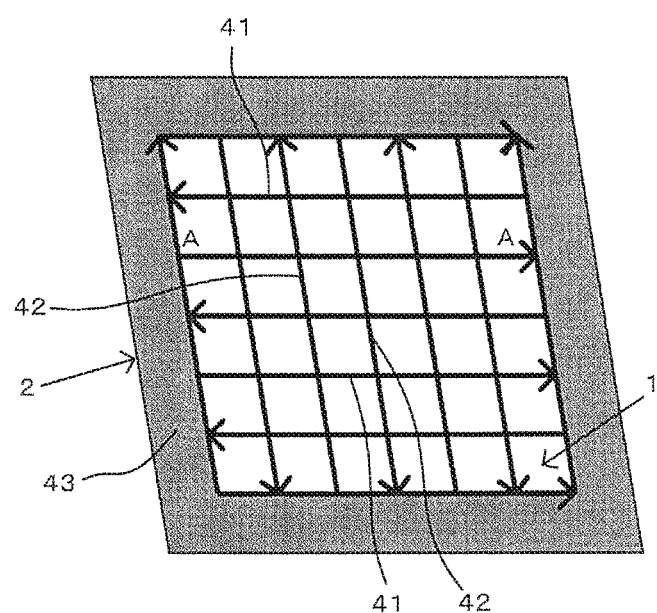
Figure 1C:
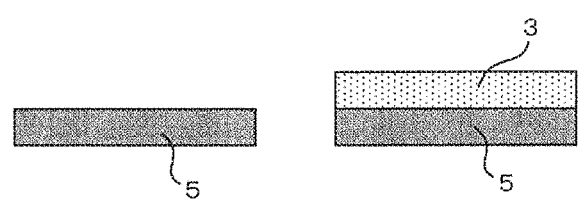
Figure 1C:
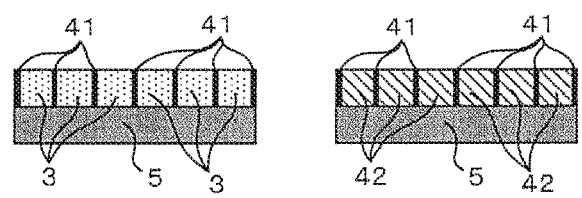
Figure 2B:
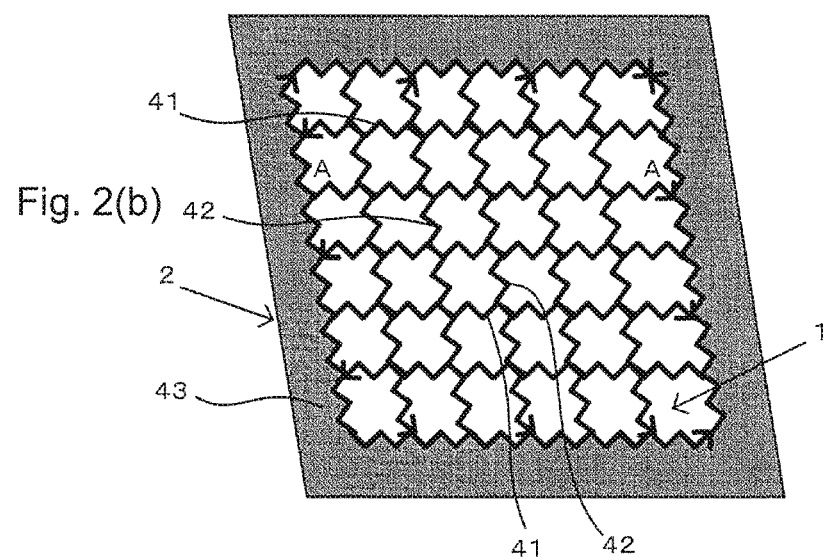
Figure 2C:
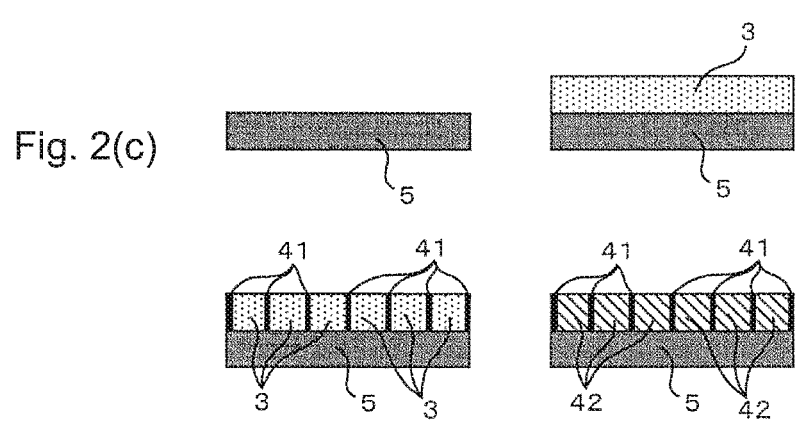

As shown in FIG. 1(a) and FIG. 2(a), angles in both directions, based on straight lines connecting both ends of each of the lines of the sintered layer 41 in the one side direction and a straight line connecting both ends of each of the lines of the sintered layer 42 in the other side direction in the lattice region 1, are typically right angles, but slanted directions may also be selected as shown in FIG. 1(b) and FIG. 2(b).

However, considering that sintering is most efficient with a perpendicular relationship, even for the slanted direction, it is most common to set an angle of 45° or greater, and therefore an intersection angle between the one side direction and the other side direction will still usually be selected as an angle between 45° and 90° for the basic construction (1).

Note that the one side direction or the other side direction is selected for scanning of the beam in the outer frame region 2, but for the outer side of the outer frame region 2, usually molding is parallel to the outer side of the lattice region 1 as shown in FIGS. 1(a) and (b) and FIGS. 2(a) and (b).

Figure 5A:
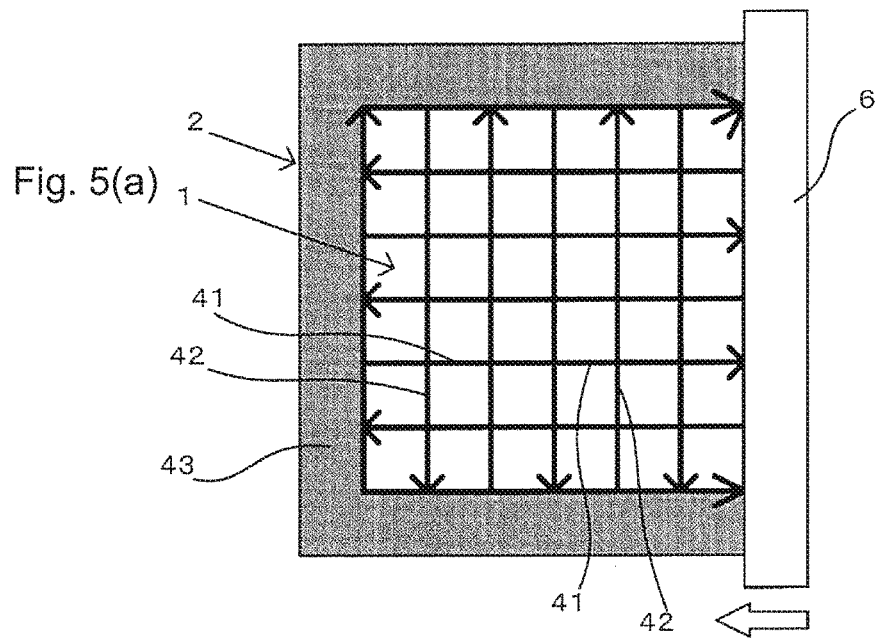
FIG. 5 is a plan view showing a relationship between the beam scanning direction and the sliding direction of the squeegee, where (a) shows an embodiment in which either the one side direction or the other side direction is perpendicular, and (b) shows an embodiment in which both directions are mutually diagonal. Note that the outline arrows indicate the direction of sliding of the squeegee while it disperses powder.

In consideration of efficient use of space, when comparing both sintering directions, with the sintered layer 41 in the one side direction or the sintered layer 42 in the other side direction for the sliding direction of the squeegee 6 and scanning of the beam, as shown in FIG. 5(a), they not only match the sliding direction, but they are also in the perpendicular relationship.

Figure 10A:
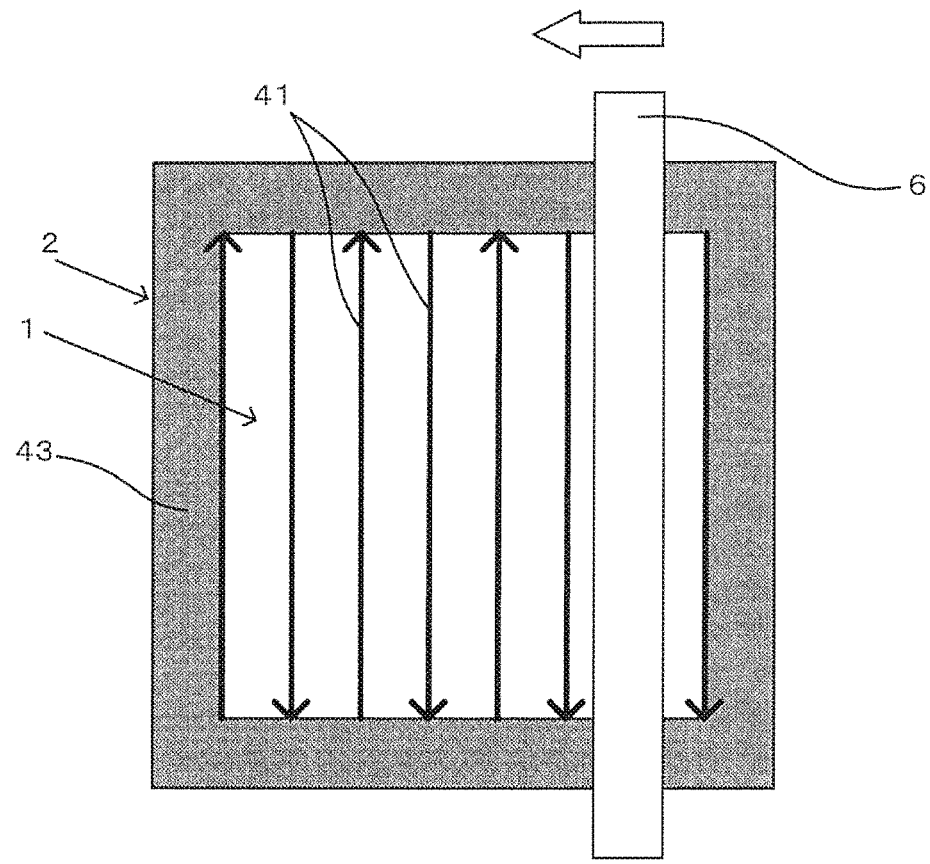
FIG. 10 shows the construction of the invention of Patent Document 2, where (a) is a plan view at the stage where the squeegee is sliding, and (b) is a cross-sectional view in the transverse direction at the same stage. Note that the outline arrows indicate the direction of sliding of the squeegee while it disperses the powder.

In this state, even if the sintered layer 42 is present in the perpendicular direction as shown in FIG. 5(a), so long as the squeegee 6 slides above the sintered layer 41 in the matching direction, it is possible to avoid unevenness on the surface of the powder layer 3 as shown in FIGS. 10(a) and (b) described above for the invention of Patent Document 2.

For the embodiment shown in FIG. 5(a), however, thickness of the powder layer 3 further molded as the squeegee 6 slides differs in the region where the line-shaped sintered layer 42 is present below and perpendicular to the sliding direction, and in the region sandwiched by the line-shaped sintered layer 42. And as a result, some difference necessarily arises in the effect of pressing force from the sliding direction edge of the squeegee 6.

Figure 10B:
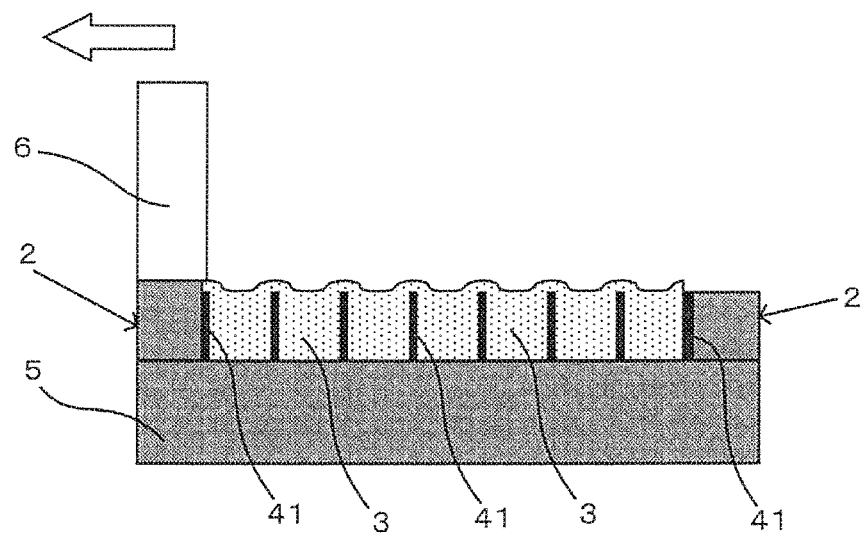

Specifically, on the lower side, the region where the line-shaped sintered layer 42 is not present has a greater effect due to pressing force by the tip of a traveling direction of the squeegee 6 than the region where the line-shaped sintered layer 42 is present, and consequently it is converted to a somewhat indented state, though the degree is much lower than in FIG. 10(b), often resulting in a fine irregular shape being formed alternately along the sliding direction of the squeegee 6.

Figure 5B:
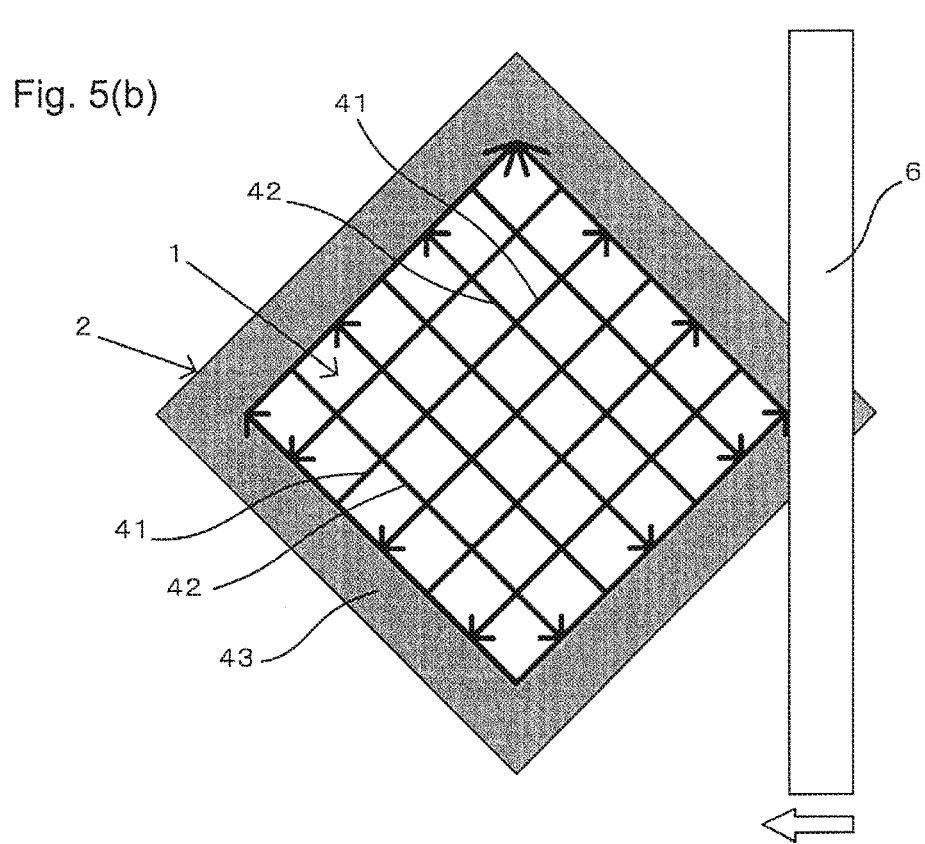

In contrast, in the case of the embodiment where the reference is based on the straight lines connecting both ends where scanning is carried out in the lattice region 1 along the sintered layer 41 in the one side direction and the sintered layer 42 in the other side direction as shown in FIG. 5(b), and the direction of sliding of the squeegee 6 in the one side direction and the other side direction are diagonal, the line-shaped sintered layer 42 is not present in the lattice region 1 along the direction perpendicular to the sliding direction of the squeegee 6 as shown in FIG. 5(a), and therefore creation of irregularities in the powder layer 3 along the sliding direction of the squeegee 6 can be avoided, and the lattice region 1 can be molded in a more stable condition based on molding of a uniform powder layer 3.

Since the region where the sintered layer 41 of the beam in the one side direction and the sintered layer 42 of the beam in the other side direction are superimposed is extremely narrow, and there is no difference in the effect of this region and the region where sintering is carried out only on the one side or only on the other side on sliding of the squeegee 6, the presence of the sintered layers 41 and 42 by superimposing does not take away the merits of the embodiment shown in FIG. 5(b).

Figure 6A:
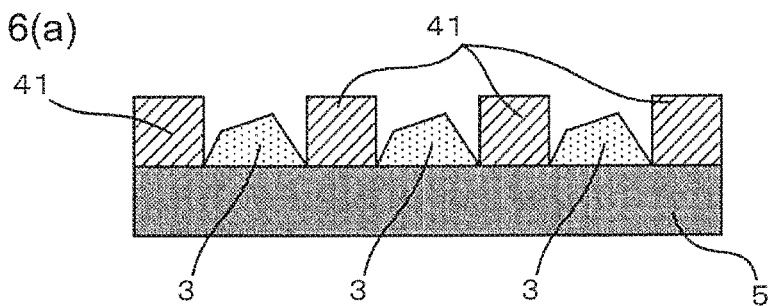
FIG. 6 shows an embodiment in which insufficient metal powder has been supplemented when the powder between sintered regions has been deficient at the stage of beam scanning in one side direction, where (a) shows a state in which the powder dispersed by sliding of the squeegee in the direction crossing the scanning direction on one side is insufficient for molding of the powder layer, (b) shows a state in which the powder that was deficient by further scanning of the squeegee has been supplemented, and (c) shows a state in which the beam has been scanned in the other side direction. Note that the outer frame regions are omitted in (a), (b) and (c).

When sintering with the beam in the one side direction has been carried out for the basic construction (1), a portion migrates to the sintered layer 41 side, and as a result, each region surrounded by the sintered layer 41 on both sides sometimes has a deficiency of the powder dispersed by sliding of the squeegee 6 in the direction crossing the scanning direction compared to the amount necessary for molding of the powder layer 3 as shown in FIG. 6(a), with the state of deficiency tending to be greater with a wider width of the region sandwiched by the line-shaped sintered layer 41.

When sintering is immediately carried out by scanning of the beam in the other side direction despite this state of deficiency, the line-shaped sintered layer 42 molded by the other side scanning becomes uneven, making it impossible to avoid molding of an uneven lattice region 1.

Figure 6B:
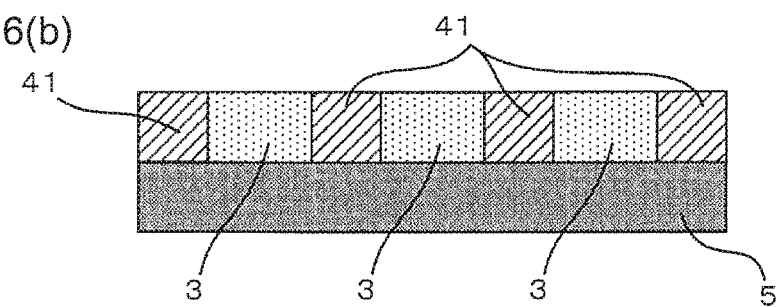

In order to avoid such a situation, when the powder of the powder layer 3 sandwiched by adjacent sintered layers is insufficient after sintering by scanning in the lattice region 1 along the one side direction as shown in FIG. 6(b) for the basic construction (1), it is possible to employ an embodiment in which a deficient powder is supplemented by renewed dispersion of powder with sliding of the squeegee 6 along that direction, at a stage prior to sintering by scanning in the scanning direction on the other side.

Figure 6C:
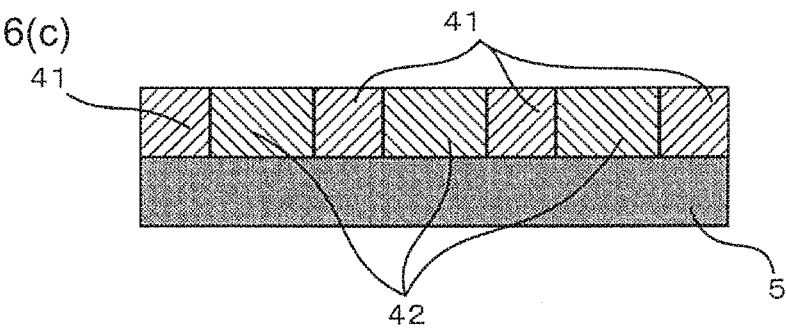

According to this embodiment, as shown in FIG. 6(c), a uniform sintered layer 42 can be formed during sintering of the next beam on the other side.

The open pores 11 formed in the basic construction (1) are surrounded on all sides by the sintered layers 41, 42, by molding on both the sintered layer 41 on the one side direction and the sintered layer 42 on the other side direction.

However, the widths of the lines for molding for the sintered layers 41, 42 do not necessarily have to have the same widths.

Figure 7A:
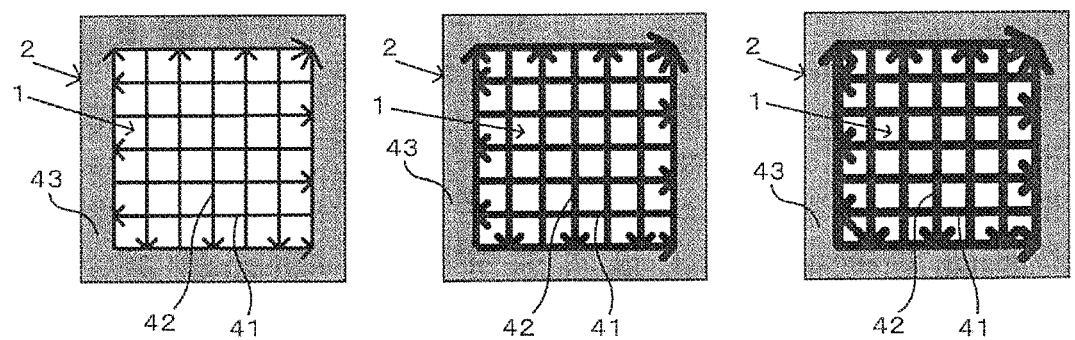
FIG. 7 shows an embodiment in which size at open pores is sequentially decreased while layering by varying beam spot diameter and beam power or scanning speed, where (a) is a plan view showing a sequentially increasing shaped width and (b) is a cross-sectional view in the transverse direction.
Figure 7B:
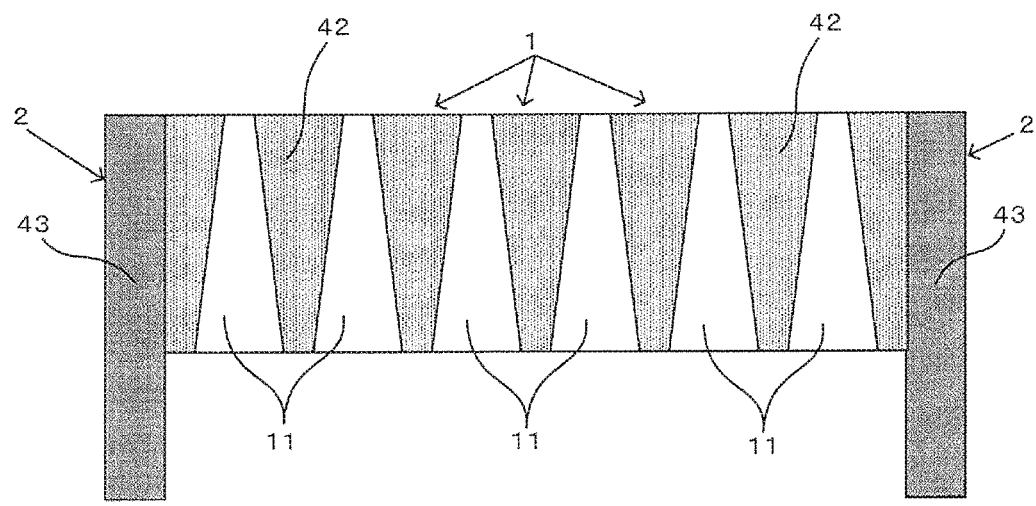

That is, as shown in FIGS. 7(a) and (b), an embodiment may be employed in which, as a number of the sintered layers is increased, the spot diameter of the beam in the lattice region 1 is sequentially increased, and either the powder of the beam is sequentially increased or the speed of scanning of the beam is sequentially decreased, or both, to set a sequentially decreasing size for the open pores 11.

Figure 8A:
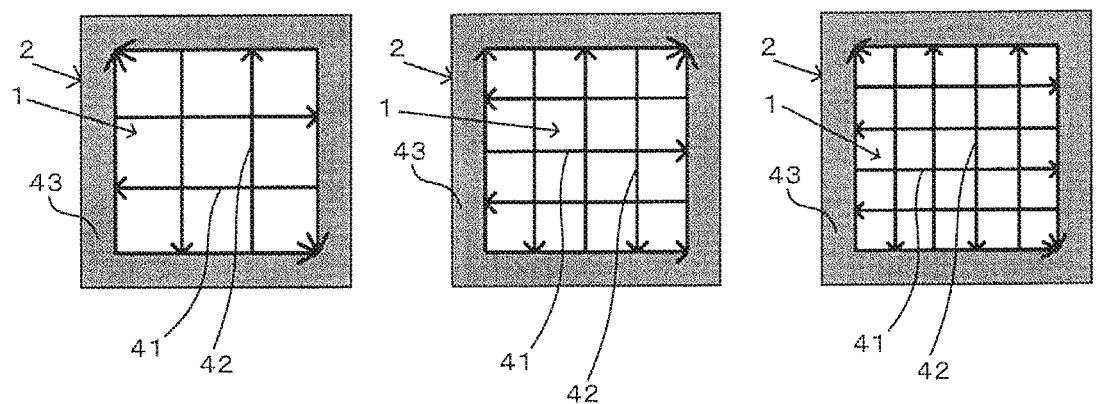
FIG. 8 shows an embodiment in which, after having selected the beam having a predetermined spot diameter, the interval of the beam scanning parallel to the one side direction and the other side direction is set to sequentially and gradually decrease, to sequentially and gradually reduce the size of the open pore, where (a) is a plan view showing sequential and gradual decrease in a beam interval, and (b) is a cross-sectional view in the transverse direction showing the same condition as (a) (the dotted lines indicate the state where the early stage beam that is varied and the later stage beam that is varied are mutually superimposed, for the beam scanning in the other side direction in the region where the beam interval gradually decreases with a step-by-step state).
Figure 8B:
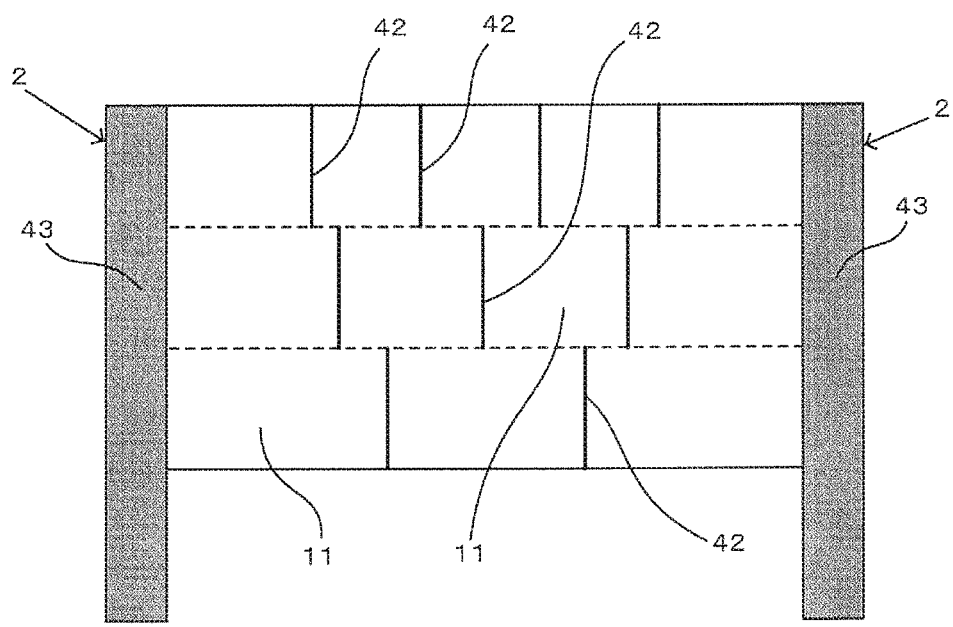

In addition, as shown in FIGS. 8(a) and (b), an embodiment may be employed in which, as the number of the sintered layers is increased, the interval of the laser beam or the electron beam scanning in the lattice region and having the predetermined spot diameter is sequentially and gradually decreased to set a sequentially and gradually decreasing size for the open pores 11 with a step-by-step state.

When a cavity die is produced by one of the aforementioned embodiments, the area of an outlet where gas stream is ejected is made smaller than an inlet where the gas stream is infused, thereby allowing ejection of the gas stream for molding at necessary pressure.

A working example of the invention will now be described.

EXAMPLE

Figure 9:
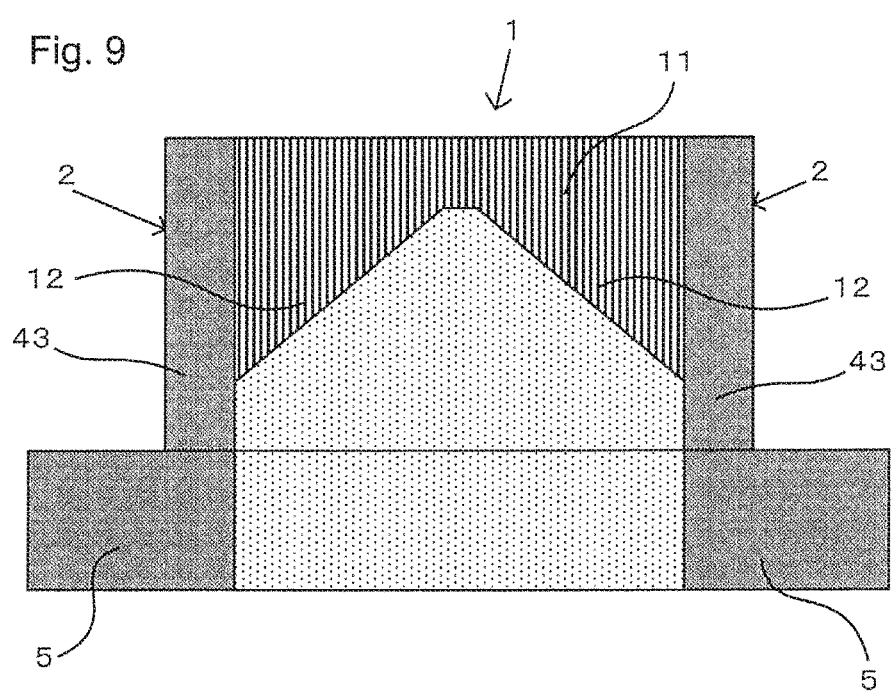
FIG. 9 is a cross-sectional view in the transverse direction showing a configuration for an example in which a partial region surrounded by the lattice region is tapered.

For molding in the lattice region 1, tubing for degassing is often situated below, which results in a base plate 5 being set only below the region where molding of the outer frame region 2 is expected to take place, as shown in FIG. 9, and molding of the lattice region 1 is often carried out without setting the base plate 5 below the region where molding of the lattice region 1 is expected to take place.

In such cases, it is essential for molding of the lattice region 1 to be carried out sequentially inward from the surrounding outer frame region 2.

For Example 1, the lattice region 1 to be molded by sintering with scanning of the beam in the lattice region 1 along the one side direction and the other side direction is surrounded by a gap on an inner side, as shown in FIG. 9, with the size of the gap being sequentially decreased as layering progresses, so that molding of the lattice region 1 is carried out in a tapered form toward the inner side.

Employing such a tapered form allows the lattice region 1 to have the necessary width in the transverse direction, and also a predetermined strength.

INDUSTRIAL APPLICABILITY

The present invention is revolutionary in that it allows a lattice structure to be obtained with firm bonding and a uniform shape, and it widens potential range of use of three-dimensional shaping with a lattice structure.

REFERENCE SIGNS LIST

1: Lattice region
11: Open pore
12: Tapered region
2: Outer frame region
3: Powder layer
41: Sintered layer in one side direction
42: Sintered layer in the other side direction
43: Continuous sintered layer
5: Base plate
6: Squeegee

What is claimed is:

1. A method for producing a three-dimensional shaped product comprising the steps of:
    establishing layering based on sequential repetition of steps of molding a powder layer by:
        dispersion of powder,
        sliding a squeegee over the dispersed powder and
        sintering the powder layer using a laser beam or an electron beam,
    targeting the sintering for each powder layer to an outer frame region which is connected to a gas-permeable lattice region and which is outside of the gas-permeable lattice region and is disposed around the entire periphery of the gas-permeable lattice region, and
    molding, for each of the powder layers targeted for the lattice region, a sintered layer along one side direction by parallel scanning of the laser beam or the electron beam having a predetermined spot diameter several times in the one side direction at a predetermined interval with mutually facing outer frame regions bonded,
    thereafter molding a sintered layer in another side direction again by parallel scanning of the laser beam or the electron beam having the predetermined spot diameter several times at the predetermined interval with mutually facing outer frame regions bonded, in the another side direction that crosses with the one side direction within each of the same powder layers, such that:
        the sintered layer along the one side direction and the sintered layer along the another side direction are crossing, and
        the sintered layer along one side and the sintered layer along another side are bonded in a superimposed state in a crossed region and are formed by the same powder layer,
    carrying out sintering on only one side or only on the another side in a non-crossed region,
    molding, while in the outer frame regions, a continuous sintered layer by scanning the laser beam or the electron beam having the predetermined spot diameter over the entire periphery that is surrounded by an inner line and an outer line, and
    further comprising the steps of:
        selecting a spot diameter that is larger than a spot diameter in the lattice region for the laser beam or the electron beam scanning the outer frame region, and
        setting a power density such that power of the laser beam or the electron beam per unit area for the spot diameter is the same as power of the laser beam or the electron beam for the lattice region.

2. The method for producing a three-dimensional shaped product according to claim 1, wherein for the shape of the outer frame region, the inner line and the outer line have an identical center location positioned in relation to a symmetry of a regular polygonal shape or a curved shape in a mutually similar relationship.

3. The method for producing a three-dimensional shaped product according to claim 1, further comprising the steps of:
    separating the outer frame regions by a predetermined width and which are divided by parallel lines selected in specific directions, and
    scanning the laser beam or the electron beam in a direction perpendicular to a parallel direction in an early stage, a later stage, or an intermediate stage of molding for the sintered layers in the lattice region.

4. The method for producing a three-dimensional shaped product according to claim 3, wherein the parallel lines are in the direction of a specific side of a regular polygonal shape.

5. The method for producing a three-dimensional shaped product according to claim 3, wherein the parallel lines are in a direction forming a maximum distance in the region surrounded by the inner line and the outer line forming a regular polygonal shape or a curved shape, for a predetermined width.

6. The method for producing a three-dimensional shaped product according to claim 1, further comprising the step of scanning, at an early stage, a later stage or an intermediate stage of molding for the sintered layer in the lattice region, the laser beam or the electron beam along a trajectory where the inner line and the outer line forming a regular polygonal shape or a curved shape are in a similar relationship.

7. The method for producing a three-dimensional shaped product according to claim 1, wherein a shape resulting from scanning in the lattice region along the one side direction and the another side direction is one of:
    a straight linear form,
    a continuous wavy form with regular variation of a curve or segment, or
    a shape in which the straight line and the wavy form are joined.

8. The method for producing a three-dimensional shaped product according to claim 1, further comprising the step of, based on straight lines connecting both ends of each of the lines where scanning is carried out in the lattice region along the one side direction and the another side direction, setting the mutually crossing angle to be in a range between 45° to 90°.

9. The method for producing a three-dimensional shaped product according to claim 1, further comprising the step of, based on straight lines connecting both ends of each of the lines where scanning is carried out in the lattice region along the one side direction and the another side direction, setting the sliding direction of the squeegee to be identical to either the one side direction or the another side direction.

10. The method for producing a three-dimensional shaped product according to claim 1, further comprising the step of, based on straight lines connecting both ends of each of the lines where scanning is carried out in the lattice region along the one side direction and the another side direction, setting the sliding direction of the squeegee to be diagonal with both the one side direction and the another side direction.

11. The method for producing a three-dimensional shaped product according to claim 1, further comprising the steps of:
    sandwiching powder of the powder layer by mutually adjacent sintered layers molded by sintering with scanning in the lattice region along the one side direction and
    when the powder dispersed by sliding of the squeegee in the direction crossing a scanning direction is not sufficient for molding of the powder layer, then newly dispersing powder with sliding of the squeegee along that direction to supplement deficient powder at an earlier stage than sintering by scanning in the scanning direction on the another side.

12. A method for producing a three-dimensional shaped product comprising the steps of:
    establishing layering based on sequential repetition of steps of molding a powder layer by:
        dispersion of powder,
        sliding a squeegee over the dispersed powder and sintering the powder layer using a laser beam or an electron beam, targeting the sintering for each powder layer to an outer frame region which is connected to a gas-permeable lattice region and which is outside of the gas-permeable lattice region and is disposed around the entire periphery of the gas-permeable lattice region, and molding, for each of the powder layers targeted for the lattice region, a sintered layer along one side direction by parallel scanning of the laser beam or the electron beam having a predetermined spot diameter several times in the one side direction at a predetermined interval with mutually facing outer frame regions bonded, thereafter molding a sintered layer in another side direction again by parallel scanning of the laser beam or the electron beam having the predetermined spot diameter several times at the predetermined interval with mutually facing outer frame regions bonded, in the another side direction that crosses with the one side direction within each of the same powder layers, such that:

the sintered layer along the one side direction and the sintered layer along the another side direction are crossing, and the sintered layer along one side and the sintered layer along another side are bonded in a superimposed state in a crossed region and are formed by the same powder layer, carrying out sintering on only one side or only on the another side in a non-crossed region, molding, while in the outer frame regions, a continuous sintered layer by scanning the laser beam or the electron beam having the predetermined spot diameter over the entire periphery that is surrounded by an inner line and an outer line, and further comprising the step of:

as a number of the sintered layers is increased, the spot diameter of the laser beam or the electron beam scanning in the lattice region is sequentially increased, and either the power of the laser beam or the electron beam is sequentially increased or the speed of scanning of the laser beam or the electron beam is sequentially decreased, or both, setting a sequentially decreasing size for open pores.

13. The method for producing a three-dimensional shaped product according to claim 12, wherein for the shape of the outer frame region, the inner line and the outer line have an identical center location positioned in relation to a symmetry of a regular polygonal shape or a curved shape in a mutually similar relationship.

14. The method for producing a three-dimensional shaped product according to claim 12, further comprising the steps of:

separating the outer frame regions by a predetermined width and which are divided by parallel lines selected in specific directions, and scanning the laser beam or the electron beam in a direction perpendicular to a parallel direction in an early stage, a later stage, or an intermediate stage of molding for the sintered layers in the lattice region.

15. The method for producing a three-dimensional shaped product according to claim 14, wherein the parallel lines are in the direction of a specific side of a regular polygonal shape.

16. The method for producing a three-dimensional shaped product according to claim 14, wherein the parallel lines are in a direction forming a maximum distance in the region surrounded by the inner line and the outer line forming a regular polygonal shape or a curved shape, for a predetermined width.

17. The method for producing a three-dimensional shaped product according to claim 12, further comprising the step of scanning, at an early stage, a later stage or an intermediate stage of molding for the sintered layer in the lattice region, the laser beam or the electron beam along a trajectory where the inner line and the outer line forming a regular polygonal shape or a curved shape are in a similar relationship.

18. The method for producing a three-dimensional shaped product according to claim 12, wherein a shape resulting from scanning in the lattice region along the one side direction and the another side direction is one of:

a straight linear form, a continuous wavy form with regular variation of a curve or segment, or a shape in which the straight line and the wavy form are joined.

19. The method for producing a three-dimensional shaped product according to claim 12, further comprising the step of, based on straight lines connecting both ends of each of the lines where scanning is carried out in the lattice region along the one side direction and the another side direction, setting the mutually crossing angle to be in a range between 45° to 90°.

20. The method for producing a three-dimensional shaped product according to claim 12, further comprising the step of, based on straight lines connecting both ends of each of the lines where scanning is carried out in the lattice region along the one side direction and the another side direction, setting the sliding direction of the squeegee to be identical to either the one side direction or the another side direction.

21. The method for producing a three-dimensional shaped product according to claim 12, further comprising the step of, based on straight lines connecting both ends of each of the lines where scanning is carried out in the lattice region along the one side direction and the another side direction, setting the sliding direction of the squeegee to be diagonal with both the one side direction and the another side direction.

22. The method for producing a three-dimensional shaped product according to claim 12, further comprising the steps of:

sandwiching powder of the powder layer by mutually adjacent sintered layers molded by sintering with scanning in the lattice region along the one side direction and when the powder dispersed by sliding of the squeegee in the direction crossing a scanning direction is not sufficient for molding of the powder layer, then newly dispersing powder with sliding of the squeegee along that direction to supplement deficient powder at an earlier stage than sintering by scanning in the scanning direction on the another side.

23. A method for producing a three-dimensional shaped product comprising the steps of:

establishing layering based on sequential repetition of steps of molding a powder layer by:

dispersion of powder, sliding a squeegee over the dispersed powder and sintering the powder layer using a laser beam or an electron beam, targeting the sintering for each powder layer to an outer frame region which is connected to a gas-permeable lattice region and which is outside of the gas-permeable lattice region and is disposed around the entire periphery of the gas-permeable lattice region, and molding, for each of the powder layers targeted for the lattice region, a sintered layer along one side direction by parallel scanning of the laser beam or the electron beam having a predetermined spot diameter several times in the one side direction at a predetermined interval with mutually facing outer frame regions bonded, thereafter molding a sintered layer in another side direction again by parallel scanning of the laser beam or the electron beam having the predetermined spot diameter several times at the predetermined interval with mutually facing outer frame regions bonded, in the another side direction that crosses with the one side direction within each of the same powder layers, such that:

the sintered layer along the one side direction and the sintered layer along the another side direction are crossing, and the sintered layer along one side and the sintered layer along another side are bonded in a superimposed state in a crossed region and are formed by the same powder layer, carrying out sintering on only one side or only on the another side in a non-crossed region, molding, while in the outer frame regions, a continuous sintered layer by scanning the laser beam or the electron beam having the predetermined spot diameter over the entire periphery that is surrounded by an inner line and an outer line, and further comprising the step of;

as the number of the sintered layers is increased, sequentially and gradually decreasing the interval of the laser beam or the electron beam scanning in the lattice region and having the predetermined spot diameter to set a sequentially and gradually decreasing size for open pores with a step-by-step state.

24. The method for producing a three-dimensional shaped product according to claim 23, wherein for the shape of the outer frame region, the inner line and the outer line have an identical center location positioned in relation to a symmetry of a regular polygonal shape or a curved shape in a mutually similar relationship.

25. The method for producing a three-dimensional shaped product according to claim 23, further comprising the steps of:

separating the outer frame regions by a predetermined width and which are divided by parallel lines selected in specific directions, and scanning the laser beam or the electron beam in a direction perpendicular to a parallel direction in an early stage, a later stage, or an intermediate stage of molding for the sintered layers in the lattice region.

26. The method for producing a three-dimensional shaped product according to claim 25, wherein the parallel lines are in the direction of a specific side of a regular polygonal shape.

27. The method for producing a three-dimensional shaped product according to claim 25, wherein the parallel lines are in a direction forming a maximum distance in the region surrounded by the inner line and the outer line forming a regular polygonal shape or a curved shape, for a predetermined width.

28. The method for producing a three-dimensional shaped product according to claim 23, further comprising the step of scanning, at an early stage, a later stage or an intermediate stage of molding for the sintered layer in the lattice region, the laser beam or the electron beam along a trajectory where the inner line and the outer line forming a regular polygonal shape or a curved shape are in a similar relationship.

29. The method for producing a three-dimensional shaped product according to claim 23, wherein a shape resulting from scanning in the lattice region along the one side direction and the another side direction is one of:
a straight linear form,
a continuous wavy form with regular variation of a curve or segment, or
a shape in which the straight line and the wavy form are joined.

30. The method for producing a three-dimensional shaped product according to claim 23, further comprising the step of, based on straight lines connecting both ends of each of the lines where scanning is carried out in the lattice region along the one side direction and the another side direction, setting the mutually crossing angle to be in a range between 45° to 90°.

31. The method for producing a three-dimensional shaped product according to claim 23, further comprising the step of, based on straight lines connecting both ends of each of the lines where scanning is carried out in the lattice region along the one side direction and the another side direction, setting the sliding direction of the squeegee to be identical to either the one side direction or the another side direction.

32. The method for producing a three-dimensional shaped product according to claim 23, further comprising the step of, based on straight lines connecting both ends of each of the lines where scanning is carried out in the lattice region along the one side direction and the another side direction, setting the sliding direction of the squeegee to be diagonal with both the one side direction and the another side direction.

33. The method for producing a three-dimensional shaped product according to claim 23, further comprising the steps of:

sandwiching powder of the powder layer by mutually adjacent sintered layers molded by sintering with scanning in the lattice region along the one side direction and when the powder dispersed by sliding of the squeegee in the direction crossing a scanning direction is not sufficient for molding of the powder layer, then newly dispersing powder with sliding of the squeegee along that direction to supplement deficient powder at an earlier stage than sintering by scanning in the scanning direction on the another side.

34. A method for producing a three-dimensional shaped product comprising the steps of:

establishing layering based on sequential repetition of steps of molding a powder layer by:
dispersion of powder,
sliding a squeegee over the dispersed powder and
sintering the powder layer using a laser beam or an electron beam, targeting the sintering for each powder layer to an outer frame region which is connected to a gas-permeable lattice region and which is outside of the gas-permeable lattice region and is disposed around the entire periphery of the gas-permeable lattice region, and molding, for each of the powder layers targeted for the lattice region, a sintered layer along one side direction by parallel scanning of the laser beam or the electron beam having a predetermined spot diameter several times in the one side direction at a predetermined interval with mutually facing outer frame regions bonded, thereafter molding a sintered layer in another side direction again by parallel scanning of the laser beam or the electron beam having the predetermined spot diameter several times at the predetermined interval with mutually facing outer frame regions bonded, in the another side direction that crosses with the one side direction within each of the same powder layers, such that:

the sintered layer along the one side direction and the sintered layer along the another side direction are crossing, and the sintered layer along one side and the sintered layer along another side are bonded in a superimposed state in a crossed region and are formed by the same powder layer, carrying out sintering on only one side or only on the another side in a non-crossed region, molding, while in the outer frame regions, a continuous sintered layer by scanning the laser beam or the electron beam having the predetermined spot diameter over the entire periphery that is surrounded by an inner line and an outer line, and further comprising the steps of:

surrounding the lattice region to be molded by sintering with scanning of the laser beam or the electron beam in the lattice region along the one side direction and the another side direction by a gap on an inner side, and sequentially decreasing a size of the gap as layering progresses, so that molding of the lattice region is carried out in a tapered form toward the inner side.

35. The method for producing a three-dimensional shaped product according to claim 34, wherein for the shape of the outer frame region, the inner line and the outer line have an identical center location positioned in relation to a symmetry of a regular polygonal shape or a curved shape in a mutually similar relationship.

36. The method for producing a three-dimensional shaped product according to claim 34, further comprising the steps of:

separating the outer frame regions by a predetermined width and which are divided by parallel lines selected in specific directions, and scanning the laser beam or the electron beam in a direction perpendicular to a parallel direction in an early stage, a later stage, or an intermediate stage of molding for the sintered layers in the lattice region.

37. The method for producing a three-dimensional shaped product according to claim 36, wherein the parallel lines are in the direction of a specific side of a regular polygonal shape.

38. The method for producing a three-dimensional shaped product according to claim 36, wherein the parallel lines are in a direction forming a maximum distance in the region surrounded by the inner line and the outer line forming a regular polygonal shape or a curved shape, for a predetermined width.

39. The method for producing a three-dimensional shaped product according to claim 34, further comprising the step of scanning, at an early stage, a later stage or an intermediate stage of molding for the sintered layer in the lattice region, the laser beam or the electron beam along a trajectory where the inner line and the outer line forming a regular polygonal shape or a curved shape are in a similar relationship.

40. The method for producing a three-dimensional shaped product according to claim 34, wherein a shape resulting from scanning in the lattice region along the one side direction and the another side direction is one of:

a straight linear form, a continuous wavy form with regular variation of a curve or segment, or a shape in which the straight line and the wavy form are joined.

41. The method for producing a three-dimensional shaped product according to claim 34, further comprising the step of, based on straight lines connecting both ends of each of the lines where scanning is carried out in the lattice region along the one side direction and the another side direction, setting the mutually crossing angle to be in a range between 45° to 90°.

42. The method for producing a three-dimensional shaped product according to claim 34, further comprising the step of, based on straight lines connecting both ends of each of the lines where scanning is carried out in the lattice region along the one side direction and the another side direction, setting the sliding direction of the squeegee to be identical to either the one side direction or the another side direction.

43. The method for producing a three-dimensional shaped product according to claim 34, further comprising the step of, based on straight lines connecting both ends of each of the lines where scanning is carried out in the lattice region along the one side direction and the another side direction, setting the sliding direction of the squeegee to be diagonal with both the one side direction and the another side direction.

44. The method for producing a three-dimensional shaped product according to claim 34, further comprising the steps of:

sandwiching powder of the powder layer by mutually adjacent sintered layers molded by sintering with scanning in the lattice region along the one side direction and when the powder dispersed by sliding of the squeegee in the direction crossing a scanning direction is not sufficient for molding of the powder layer, then newly dispersing powder with sliding of the squeegee along that direction to supplement deficient powder at an earlier stage than sintering by scanning in the scanning direction on the another side.

\* \* \* \* \*